March 3, 1942.  M. J. DORCAS  2,275,375
IRRADIATION METHOD AND APPARATUS
Filed Aug. 22, 1939  2 Sheets-Sheet 2
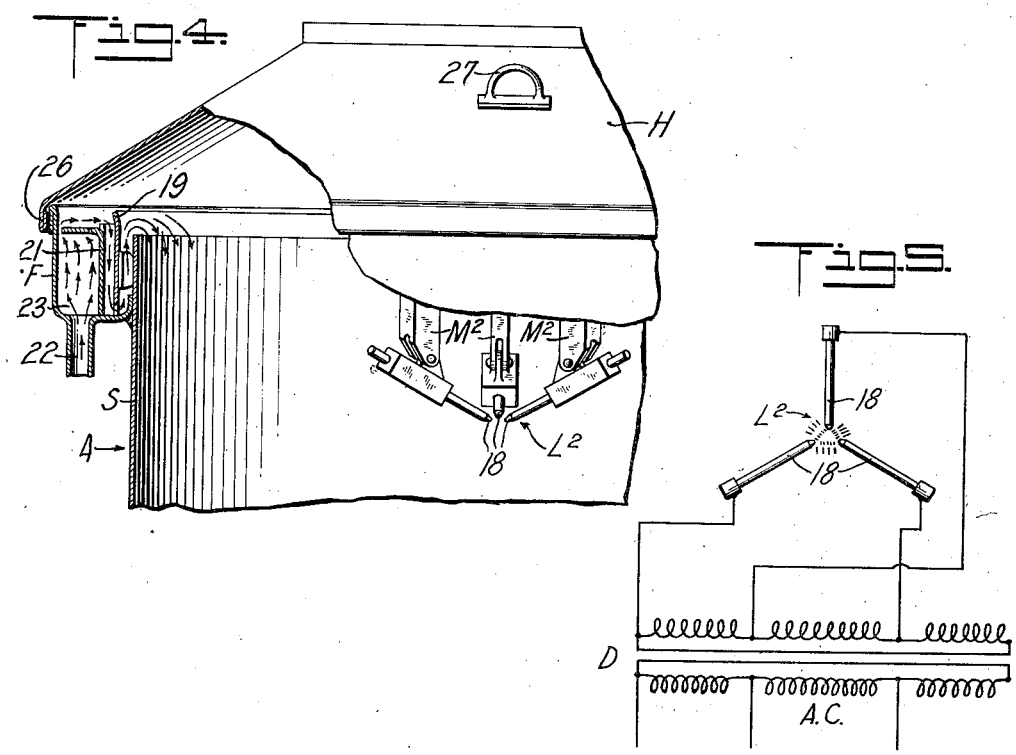
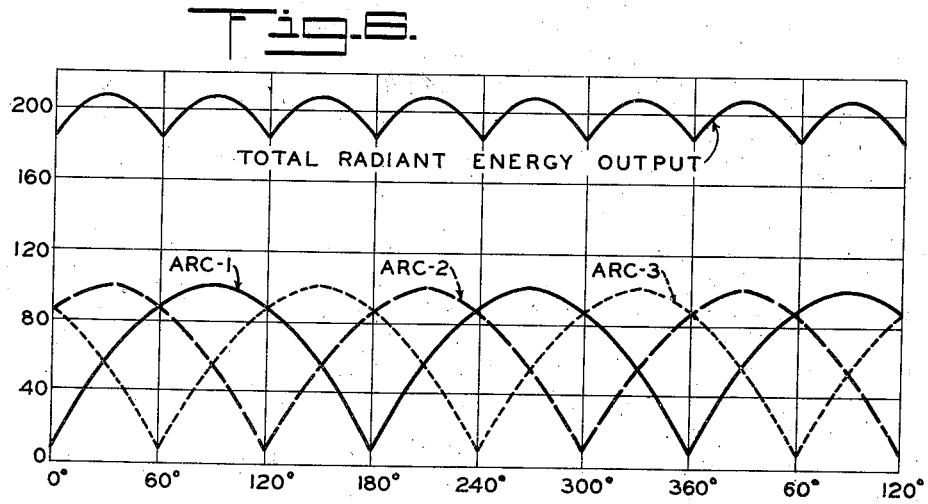
INVENTOR
MERRILL J. DORCAS
BY
ATTORNEY Patented Mar. 3, 1942

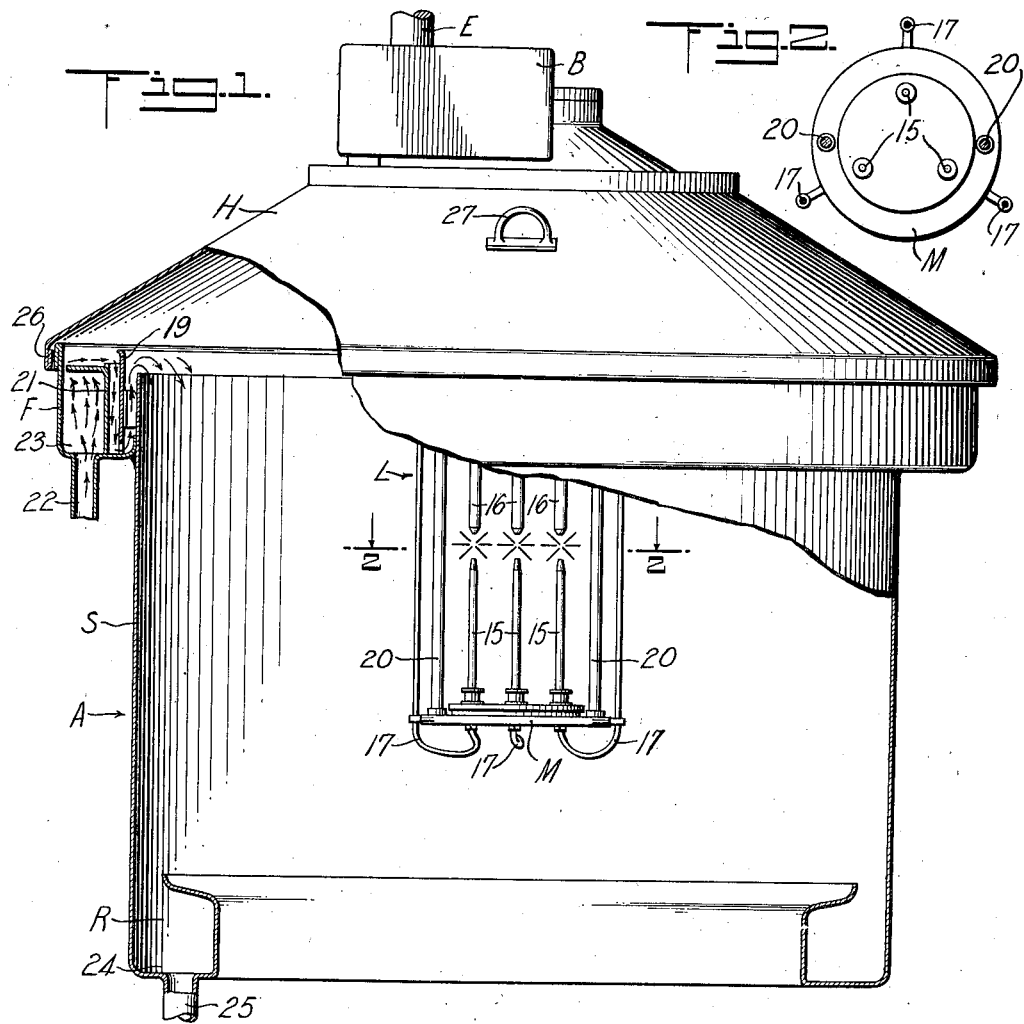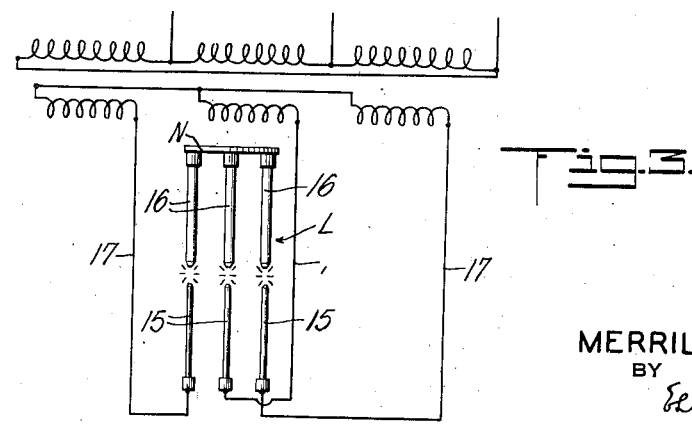

2,275,375

UNITED STATES PATENT OFFICE 2,275,375

IRRADIATION METHOD AND APPARATUS

Merrill J. Dorcas, Berea, Ohio, assignor to National Carbon Company, Inc., a corporation of New York Application August 22, 1939, Serial No. 291,314

20 Claims. (Cl. 250—49)

This invention relates to a method of and apparatus for irradiating materials with radiant energy and particularly to the irradiation of food-stuffs such as milk with radiant energy within the ultra-violet range of frequencies, for the purpose of changing properties or characteristics thereof.

It is known that when organic substances are irradiated with appropriate forms of energy useful changes may be induced therein. An example of such a change is the formation of vitamin D when milk is irradiated with "ultra-violet energy," radiant energy within the ultra-violet range of frequencies.

The irradiation of milk with ultra-violet energy for the purpose of increasing its value by increasing the vitamin D content has been studied by many independent investigators since about 1924 when the method was first publicized. The method has been used commercially since 1926, by the simple process of spreading the milk in a thin film and exposing it to a source of radiant ultra-violet energy for a short period, one or a few seconds. Variations in details of the process have been made from time to time but the process has remained essentially the same.

While many theories have been advanced to explain various parts of the mechanism of irradiation, the details of this process of synthesis of vitamin D are probably but imperfectly understood. Most of those who have studied this process assume that a minor constituent of normal milk, probably one of the sterols, exists in the milk in two forms. One small portion is in an activated form and has the property of altering mineral metabolism when introduced into a living system: this is one of the several substances called vitamin D. The other and larger portion of this sterol is not a vitamin D; but it can absorb ultra-violet energy of a frequency about 2800 Angstrom units, and then acquires a new set of properties: it becomes activated, it becomes a vitamin D.

The exact chemical identity of this activatable sterol is not known. Probably, it is one of the derivatives of cholesterol. Its concentration in milk is not known but it probably is in a concentration of less than one one-hundredth of a milligram per quart (less than one part in one hundred million) of the milk. The precise mechanism of the absorption of the ultra-violet energy and the nature of the difference between the activated or inactivated forms is not known, but it probably involves a photo-chemical absorption of energy by the molecule, which results in an isomerization to a similar compound having a higher energy content and the different or more active properties that we recognize as vitamin D. The precise location of the sterol in the milk is not known. After activation, or in the activated form, it is usually found dissolved in, or associated with, the fat, but since under some conditions skim milk can be highly activated, it seems not to be dissolved in the fat in the inactive form. It can be assumed to be in very small particles in the water phase of the milk or adsorbed on the surface of one of the colloidal protein particles in the milk. For convenience, the activatable sterol is sometimes called provitamin.

Since vitamin D has the property of promoting calcium metabolism and is beneficial in the prevention or cure of rickets, a substance rich in vitamin D is said to have a high antirachitic potency. The determination of the proportion of vitamin D present or of the antirachitic potency is a difficult one and is best made by feeding the substance to be tested to animals under closely controlled conditions. Such methods of biological assay have been standardized in the United States Pharmacopoeia, XIth edition. The unit now in use is the one specified therein and is an arbitrary unit called U. S. P. XI. When it is desired to express concentrations, the number of units per given volume is stated. The unit of volume containing the vitamin is selected according to convenience. In the case of vitamins in milk, the antirachitic potency is given in U. S. P. XI units per quart of milk. In the irradiated milk as now sold commercially the value of 120 to 135 U. S. P. XI units per quart has been considered acceptable. Natural milk may contain only 10 U. S. P. XI units per quart.

There is a demand for milk having an antirachitic potency greater than 120 to 135 U. S. P. XI units; in fact, there is a demand for milk having a potency greater than 350 U. S. P. XI units. Some increase in the antirachitic potency of vitamin D content of milk may be produced by prolonged irradiation with the methods and means heretofore available; but increasing the time of irradiation produces certain undesirable changes in the milk, including undesirable changes in taste and odor which make the milk commercially unacceptable.

The changes in taste and odor, hereinafter referred to as "organoleptic" effects, apparently are not the only deleterious effects of "over irradiation." When too prolonged, irradiation destroys some of the vitamin D previously produced, thus actually reducing the antirachitic potency of the irradiated substance.

It is an object of this invention to provide a method and an apparatus for producing relatively high antirachitic potencies in various food substances, especially milk, while maintaining such substances in a commercially acceptable condition.

A further object of the invention is to provide an irradiating apparatus capable of operating efficiently at widely different rates of throughput of material undergoing irradiation.

A still further object of this invention is to produce an irradiator which has a much greater capacity than any, of similar size, heretofore commercially available.

Yet another object of this invention is to produce irradiated milk of high antirachitic potency, i. e. a potency of well over 300 U. S. P. XI units and preferably from 375 to 425 U. S. P. XI units, and having a taste and an odor commercially similar to the milk before irradiation. Such milk product is described and claimed in application Serial No. 384,619, filed March 22, 1941, as a division hereof. Other objects of this invention will become apparent from the following description of the invention.

The invention will be more particularly described with reference to the accompanying drawings, in which:

Fig. 1 is a side view of one form of a liquid irradiating apparatus embodying features of this invention, part of the apparatus being broken away and shown in vertical cross section;

Fig. 2 is a view in horizontal section taken on line 2—2 of Fig. 1 showing the spaced relations of the three pairs of electrodes and of the conduits supplying current thereto;

Fig. 3 is a simplified circuit diagram for the six electrode three-phase arc unit shown in Figs. 1 and 2;

Fig. 4 is a view similar to Fig. 1 of a portion of an apparatus illustrating another embodiment of this invention in which a three electrode three-phase arc is employed;

Fig. 5 is a simplified circuit diagram of the three-phase three electrode arc unit shown in Fig. 4; and Fig. 6 is a graph showing the variation in intensity of radiant energy emission from a three-phase alternating current arc plotted against time.

In general, the objects of the invention are achieved by impinging against the material to be treated ultra-violet energy having the character of that emitted by a multi-electrode arc lamp energized by polyphase alternating current. One advantageous use of the principles of the invention consists in constantly exposing against one side only of a moving or flowing stream or film of fluid material to ultra-violet energy emitted by a multi-electrode arc lamp energized by alternating current of not less than three phases.

With no intention of limiting the scope of this invention, but in order to disclose advantageous embodiments thereof, the drawings illustrate two types of apparatus for irradiating liquid milk according to this invention. In such apparatus the milk, in the form of a wide thin film flowing along a supporting surface, is irradiated by impinging against such flowing film ultra-violet light or energy emitted by a a multi-electrode carbon arc lamp energized by three-phase alternating current.

In the apparatus disclosed in Figs. 1, 2, and 3, for example, the liquid milk is uniformly fed by a suitable feeding device F onto the interior surface of a vertical cylindrical shell S so as to flow downwardly by gravity along the interior surface into a suitable receiver R. This thin milk film is irradiated during its descent by impinging thereagainst ultra-violet light emitted by the three-phase arc lamp L which is mounted centrally or coaxially within the shell S so that all portions of the cylindrical downwardly flowing milk film will have substantially equal intensities of ultra-violet energy impinged thereon.

The lamp L is mounted in the position shown in Fig. 1 in any convenient manner. It is preferred to have it suspended from a hood H to be described in detail later. The lamp comprises a bottom member M on which are mounted three lower electrodes 15. The lower electrodes are insulated from the bottom member M and each one is supplied with current through one of the symmetrically placed conductors 17, as is best seen in section in Fig. 2. Each of the conductors 17 is also insulated from the bottom member M. The downwardly extending portions of the conductors 17 are so disposed that the magnetic flux of the current flowing in them will be favorable for the maintenance of arcs between the lower electrodes 15 and upper electrodes 16. The upper carbon electrodes 16, as is best shown in Fig. 3, are electrically connected to each other by a member N. The connection between each electrode 16 and the member N is a lost motion connection, so that each of the electrodes 16 will contact its corresponding electrode 15 in striking the arc. It will be evident from Fig. 3 that the electrodes are Y connected to the secondary windings of a transformer, the primary windings of which are connected to the power line. The transformer not only serves to step down the voltage to that required by the arc but also serves as a ballast for the arc. As the carbons are consumed the length of the arc is regulated by moving the upper member N downward. The lower member M is supported by the hangers 20. Any suitable form of control may be used in moving the upper member N downward but it is preferred to employ a motor, the operation of which is controlled by current flowing through the arc. Such controlled feeds for arc lamps are old and form no part of the present invention. This control feed also serves to strike the arc initially in the usual manner.

In Figs. 4 and 5 there is shown an irradiator including a shell S within which is a lamp $L^2$ comprising three carbon electrodes 18 mounted on a suitable mechanism $M^2$. The lamp or arc unit has the electrodes 13 disposed in inverted pyramidal fashion to provide three arcs or streams of alternating electrical current between the bottom ends of the electrodes 18, the arcs being disposed in delta relation. The arc unit $L^2$ is energized from an alternating power source preferably through a delta connection to the transformer D.

The apparatus A used in connection with either form of arc unit includes the cylindrical shell S, the inner surface of which serves as the surface over which the liquid being irradiated flows. Since this liquid will generally be milk it will hereinafter be referred to as milk, although this is not to be construed as a limitation to milk. Surrounding the upper periphery of the shell S is a feeding device F, consisting of a trough 23 within which are annular baffles 19 and 21. As shown the baffle 21 is disposed outwardly of the baffle 19. The outer baffle 21 is designed to rest on the floor of the trough 23 and the milk, which enters the feeding device F through a pipe or other conduit 22, flows over the top of the baffle 21. The inner baffle 19 is spaced above the bottom of the trough 23 in any suitable manner but preferably by being provided with legs which rest on the bottom of the trough 23. The upper edge of the baffle 19 extends above the upper edge of the baffle 21 and above the upper edge of the shell S. Thus, it will be seen that the milk or other liquid to be irradiated enters through the conduit 22, the greater portion thereof flows over the baffle 21 and practically the entire portion flows under the baffle 19. The trough is filled with milk as shown in the drawings to, or slightly above, the upper edge of the shell S. It then flows over the upper edge of the shell S and forms a thin film flowing downwardly over the inner surface of the shell. The action of the baffles 19 and 21 is to distribute the milk evenly around the upper edge of the shell. It is not necessary that the baffle 21 be secured to the trough so that no milk passes under it. On the contrary it is desirable that this baffle, as well as the baffle 19, be removable for the purpose of cleaning.

At the bottom of the shell S is a receiver R which receives the milk which has passed over the inner surface of the shell S and has been irradiated. The receiver R is in the shape of a trough 24. The inner wall of the trough is preferably flanged upwardly and inwardly as shown in the drawing to prevent or shield the milk in the trough from receiving energy from the lamp L or the lamp L² as the case may be. This flange is particularly important in case foam is formed, as the foam would remain in the receiver R and be subjected to irradiation for long periods. The milk is removed from the receiver R through any convenient means such as an outlet 25.

A hood H, which is preferably conical in form and made of sheet metal, is disposed above the shell S. The hood may be provided with a dependent cylindrical rim 26 which surrounds the outer wall of the feeding device F. The hood H is mounted as on a bracket B; and means are provided whereby it may be moved upwardly, as by grasping a handle 27, and then swung in a horizontal plane to permit access to the interior of the shell S. Also secured to the top of the hood H is an exhaust conduit E through which air from around the lamp may be removed. This is preferably connected to a means for producing suction. The air removed through the conduit E is replaced by air entering at the bottom of the shell S, which is preferably mounted above the level of the floor in a conventional frame work.

While various detailed types of film supporting surfaces, feeding devices, receiving troughs and the like have been described in detail other embodiments may be used without departing from the principles of the invention. The essential principles of the invention consist in the use of polyphase arcs and preferably at least three polyphase arcs, since these have been found to produce a high degree of antirachitic activation, especially in milk. The following statement of a possible theory is submitted as one which appears possible but the invention is not to be considered to be limited to any particular theory.

Since the activation by light is assumed to be an ordinary photochemical reaction, the process may be considered from the standpoint of the known laws of photochemistry. One of the simplest of these is the Grotthuss-Draper theory, or law which states that only the energy that is absorbed by the reacting substance can be photochemically active. This can be interpreted to mean that only ultra-violet energy that is absorbed by the sterol molecules can be effective in making the change to a vitamin D, or if the absence of photochemical chain reactions is assumed, the converse, that only the molecules of sterol which are reached by, and absorb, the ultra-violet energy can be changed to vitamin D, may be stated.

This may be considered in connection with the application of ultra-violet energy to the surface of a film of milk. Extensive investigations have shown that some ultra-violet energy can pass through a few tenths of a millimeter of milk film. Milk can be considered to be a suspension of opaque casein and other protein particles, fat particles, and possibly other particles that are small but opaque. These sterol particles may be much smaller and might be shadowed or protected from ultra-violet energy if they were on the dark side of opaque particles. Bacteriological experiments have shown that in the process of sterilizing water with ultra-violet energy a turbid water rendered the process ineffective, and even clumping of bacteria interfered with the process. It seems as if one micro-organism can hide behind another, or a particle of mud or other cause of the turbidity, and be safe from the lethal action of the light. It might be that an analogous situation applies in the irradiation of milk. That is, since the light comes from one direction or one side of the film, many of the particles of activatable sterol may be shielded by the larger, more numerous, opaque colloidal particles in the milk and thus be unacted on by the ultra-violet energy. It is further probable that these individual portions of milk are in rapid movement and that the relative positions of activatable sterol and large shadowing particles may rapidly change. A sterol particle may be in a position to have an unobstructed path between it and the light source and thus be in a position to be struck by the light beam and therefore absorb ultra-violet energy and be activated to a vitamin for only a small fraction of the total time of the exposure of the milk film as a whole. This may be perhaps only a single instant, may be only one one-thousandth of the total exposure of a second or two that the drop of milk as a whole is exposed. This proportion of time would of course vary with the concentration of milk solids in the milk, the agitation and thickness of the film and some other factors.

Ultra-violet energy sources used in milk irradiation are usually electric arcs. The economics of installation and operation usually require that these be operated on alternating current. The radiation from alternating current arcs is intermittent in nature. On the ordinary 60 cycle current the current increases to a maximum and diminishes to zero 120 times a second. The light from an arc is an almost instantaneous function of the current. It likewise increases to a maximum and diminishes to a low figure, if not quite zero, 120 times a second.

It will be seen that ordinary commercial light sources used for milk irradiation give light and ultra-violet energy near maximum intensity only part of the time—perhaps only half the time. If this intermittent illumination be considered as applied to a milk film and the intermittent nature of the opportunity of the light to perform its function on the sterol also be considered it will be found that if the light burns at most effective intensity only half the time and the sterol has on the average only one instant for its chance for activation, only half of the molecules may be activated.

This theory has been tested. It is difficult to change the rapid motion of the particles composing the moving milk film. However, light that is continuous has been applied i. e. light from direct current arcs that is steady and constant has been shown to be about twice as effective in forming vitamin D in milk as were similar amounts of ultra-violet energy from alternating current arcs.

Direct current arcs, while useful for this experiment, are costly to install and operate. A light source that would operate on the commonly available alternating current and still give the continuous radiation and consequent high efficiency of the direct current arcs was sought and found.

The ordinary electric arc on direct or single phase alternating current is maintained as a single gaseous discharge between two electrodes. By various arrangements of more than two electrodes as described herein it is possible to use polyphase, usually three-phase, alternating electric current and secure radiation that is continuous with respect to time and not intermittent as radiation from single phase alternating current arcs.

The current in each phase of a three phase arc passes through the same cycle as the current in a single phase arc. That is, the peaks of current value, on a 60 cycle system, and the corresponding peaks of radiant energy, recur at intervals of 1/120 of a second. These peaks of current and energy emission do not occur simultaneously in the three phases of a three-phase arc, but follow one another at equally spaced time intervals. Peaks of energy emission, therefore, occur every 1/360 of a second. The light from each phase overlaps that of the two other phases with respect to time so that continuous radiation is obtained. This is illustrated diagrammatically in Fig. 6. The amount of energy emitted by the various arcs with respect to time is shown at the bottom part of the graph. Arc 1 is shown in full lines, arc 2 is shown in dashed lines, and arc 3 in dotted lines. The figures at the bottom from 0 to 360 represent one complete cycle in the case of arc 1. The figures at the left represent arbitrary values for energy emission. It will be noted that the energy emission does not reach 0 as a minimum. This is due to the fact that the cycles are so rapid that the electrodes do not cool below incandescence. However, the amount of energy emitted by the incandescence of the hot electrodes between cycles is not considered substantial in the terminology used in this application. The upper curve represents the total energy emitted by the three arcs. It will be evident that a substantial amount of energy is emitted at all times. The energy which is emitted may be of various wave lengths. Energy used in irradiation to produce antirachitic potency should contain a large amount of wave lengths within the ultra-violet region, particularly in the vicinity of 2800 Å. The wave length of the energy emitted can be modified by the type or source of energy used. When the energy source takes the form of a so-called "carbon" arc the modification consists of the addition of materials to the "carbon" electrodes. This may either be in the shell of the electrode or the core thereof or in both the shell and the core or the electrode may be homogeneous. In all cases, notwithstanding the addition of the so-called "flame material," these consumable electrodes are spoken of as carbon electrodes.

As a result of the use of polyphase alternating current arcs it has not only been found possible to produce a milk having higher antirachitic potency, i. e. a greater vitamin D content, than was hitherto possible, but it has also been found possible to irradiate a greater amount of milk than was heretofore the case with a single irradiator of similar size. Using a total power input of 12.5 kilowatts through a three-arc, Y connected, vertical trim, six electrode unit burning three 22 millimeter (diameter) carbon electrodes in the upper and three thirteen millimeter (diameter) carbon electrodes in the lower holders, each electrode spaced about 13 11/16 inches from a shell 32 inches in diameter and 20 inches high, it has been possible to produce milk having a potency of 400 U. S. P. XI units per quart at the rate of 5000 pounds per hour, or milk having a potency of 135 U. S. P. XI units per quart at the rate of 17,500 pounds per hour. In producing milk having an antirachitic potency in the neighborhood of 400 U. S. P. XI units per quart, e. g. upwards of 375 U. S. P. XI units per quart, the rate of flow should be between 500 and 700 pounds of milk per hour per linear horizontal foot of film. A rate of 600 pounds per hour per linear foot of film has been found especially satisfactory. Thus, the capacity of an irradiator of a given size may be increased substantially in the quantity, or the vitamin D potency or both, of the product without deleteriously affecting either the flavor or the odor.

With this same apparatus, it is possible to irradiate milk at rates varying from 4000 pounds to 17,500 pounds per hour. Thus, it will be seen that the apparatus is capable of wide variations in the amount of milk treated per hour. Moreover, the amount of floor space occupied is no greater than that of irradiators formerly commercially available which would irradiate only a maximum of 6000 pounds of milk per hour. The fact that one irradiator will do the work of three irradiators heretofore available makes for greater economy. Sanitary regulations usually require that every piece of apparatus in a dairy shall be completely disassembled and scrubbed at frequent intervals. By replacing three of the former types of irradiators with one of the type of this invention, the amount of apparatus to be cleaned has been considerably lessened. Moreover, the effective surface over which the liquid flows has an area of only about 15 sq. ft. (a horizontal length of only 8⅓ ft. and a vertical height of 1' 10").

It should be noted that while the process and apparatus of this invention are especially applicable to the treatment of fluid by irradiation they are also applicable to the treatment of other food-stuffs and especially other liquid products, such as partially condensed milk or partially evaporated milk, condensed milk, evaporated milk, fruit juices, distilled liquors, wines, beer and malt products. It may also be applied to food-stuffs in granular or unagglomerated form moved in a layer past the source of ultra-violet energy. The invention is also applicable to the irradiation or treatment with ultra-violet energy of other liquids, such as linseed oil and petroleum products, where it is desirable to change the physical or chemical properties thereof by irradiation with suitable forms of radiant energy. It may also be used in the sterilization of water. It may also be used to irradiate other solids, especially in the form of sheets and of powder or unagglomerated particles where suitable means are provided to conduct the matter through the radiant energy emitted by the multi-phase alternating current source so that such matter is exposed to said source while in motion.

While the process and apparatus has been described in connection with the use of carbon electrodes, it is to be understood that other forms of arcs, using electrodes of other materials, may be used. While the arcs have been shown as unenclosed they may be enclosed if so desired, as for the purpose of having the arc formed in an atmosphere at reduced pressure and especially in an atmosphere of a substance other than air. However, in case the arc unit or individual arcs are enclosed, a material must be used which will pass the energy of wave lengths that produce antirachitic activation, i. e. those in the vicinity of 2800 Å. An example of such material is quartz.

I claim:

1. A process of treating material to change at least one of the properties thereof which comprises impinging against such material ultra-violet energy of the character emitted by a multi-electrode arc lamp energized by polyphase alternating current.

2. In a process for treating material capable of undergoing change in physical, or chemical, or both physical and chemical properties when exposed to ultra-violet energy, the step which includes impinging against such material ultra-violet energy of the character emitted by a multi-electrode arc lamp energized by three-phase alternating current.

3. A process of treating fluid material to change physical, or chemical, or both physical and chemical properties thereof which comprises continuously flowing such material in the form of a film or layer, and impinging against such flowing layer or film ultra-violet energy of the character emitted by a multi-electrode arc lamp energized by three-phase alternating current.

4. A process of irradiating a food-stuff adapted to flow in the form of a film or a layer along a supporting surface, which comprises continuously flowing such food-stuff in the form of a film or a layer along said surface; and impinging against such flowing film or layer ultra-violet energy emitted by a multi-arc device energized by polyphase alternating current.

5. The method of treating liquid food products which comprises the steps of moving the food products and constantly exposing one side only of the same to the radiation of at least three arcs which are so energized by a source of polyphase alternating current that at least one of said arcs is emitting substantial energy at any given moment.

6. Process of irradiating organic matter which comprises moving such organic matter through radiant energy of the character emitted by polyphase alternating current carbon arcs having cyclic variations in intensity temporally overlapping one another in operation.

7. The process of treating liquid which comprises causing the liquid to flow in a film or layer under the influence of gravity downwardly along a surface while exposing said film to radiant energy of the character emitted by multi-phase electric arc means so energized that at least one of said arc means is emitting substantial radiant energy at any given moment.

8. In the art of irradiating milk, the method of producing milk having upward of 375 U. S. P. XI units of vitamin D per quart and a flavor commercially similar to that of the same milk before irradiation, which method comprises passing milk in a film at a rate of 500 to 700 pounds per hour per linear horizontal foot of film, and exposing said film to the radiation from a passage of a plurality of streams of alternating current between electrodes, said streams being in overlapping phase relationship and the total energy input to said streams being of the order of 12.5 kilowatts.

9. Method as set forth in claim 8 in which said rate is about 600 pounds per hour per linear horizontal foot of film.

10. Process of irradiating liquid comprising the step of causing the liquid to flow in a film and impinging against such film radiant energy of the character emitted by carbon arcs so energized by three phase alternating current that at least two arcs are emitting substantial radiant energy at all times.

11. Apparatus for treating material comprising, in combination, a source of ultra-violet energy of the character emitted by a multi-electrode arc lamp energized by polyphase alternating current; and means spaced from said source for supporting said material for movement relatively to said source, whereby such ultra-violet energy is impinged against successive portions of said material.

12. Apparatus for treating liquid food-stuffs with radiant energy comprising a surface, a feeding device for supplying liquid to said surface, a receiver for collecting liquid from said surface, a plurality of electric arcs so disposed as to emit energy which will impinge upon said surface and alternating current means energizing said arcs so that at least two arcs are effective at any given moment to emit substantial radiant energy.

13. Apparatus for irradiating fluid material comprising, in combination, means providing a surface to support said material while the latter flows along said surface in the form of a film or layer; a source of polyphase alternating current; and a multi-arc device in circuit with said source of current and providing a source of ultra-violet energy impinging against such flowing film or layer.

14. Apparatus for irradiating a food-stuff comprising, in combination, means providing a surface to support such food-stuff while the latter continuously flows by gravity along said surface in the form of a film or layer; a source of three-phase alternating current; and a multi-arc device in circuit with said source of current and providing a source of ultra-violet energy impinging against such flowing film or layer of food-stuff.

15. Apparatus for irradiating food-stuffs comprising a source of radiant energy comprising a plurality of electric arcs arranged in symmetrical relation, means acting to energize said arcs consecutively so that at least two arcs are effective at any given moment to emit substantial radiant energy and means for exposing a food-stuff to said source of radiant energy.

16. Apparatus for irradiating moving matter comprising a source of radiant energy consisting of electric arc means having three carbon electrodes disposed in pyramidal fashion with apex downwardly; a source of three-phase alternating current connected to said electrodes to produce three-phase alternating arcs, and means for moving the matter to be irradiated through the energy radiated from said source.

17. Apparatus for irradiating moving matter comprising a source of radiant energy consisting of electric arc means having three pairs of cooperating electrodes arranged in equally spaced relationship, a source of three-phase alternating current connected in circuit with said electrode to produce three arcs having cyclic variations in intensity and means for moving the matter to be irradiated through the radiant energy emitted by said electric arc means.

18. Apparatus as claimed in claim 15 in which the electrodes are connected in Y connection, said circuit including three conductors disposed outwardly of and parallel to said electrodes so that the magnetic flux produced by the current flowing in said conductors has a tendency to stabilize the arcs.

19. Liquid irradiating apparatus comprising the combination of a surface over which a liquid to be irradiated is adapted to flow under the influence of gravity; a feeding device for supplying liquid to the upper part of said surface; a receiver for collecting liquid from the lower part of said surface; a source of multi-phase alternating current; at least three carbon electrodes in circuit with said multi-phase current power source, said electrodes being so constructed and arranged with respect to one another as to produce a plurality of electric arcs at least two of which arcs are in effective operation at all times and being so disposed with respect to said surface that energy emitted from said arcs falls upon the liquid flowing over said surface.

20. Liquid irradiating apparatus comprising the combination of a surface over which liquid to be irradiated is adapted to flow under the influence of gravity; feeding means for supplying liquid to the upper part of said surface; a source of energy comprising a plurality of electrodes so constructed and arranged as to produce a plurality of electric arcs, at least two of which arcs are in effective operation at all times, and a receiver for collecting liquid from the lower part of said surface, said receiver comprising a trough and means to shield the liquid in the trough from the energy from said arcs.

MERRILL J. DORCAS.

CERTIFICATE OF CORRECTION.

Patent No. 2,275,375. March 3, 1942.

MERRILL J. DORCAS.

It is hereby certified that error appears in the printed specification of the above numbered patent requiring correction as follows: Page 2, first column, line 59, strike out "against"; page 6, first column, line 20, for the claim reference numeral "15" read --16--; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.